(12) United States Patent
Hasegawa et al.

(10) Patent No.: US 9,934,901 B2
(45) Date of Patent: Apr. 3, 2018

(54) NEAR-FIELD COMMUNICATIONS ELEMENT AND ELECTRONIC DEVICE HAVING SAME MOUNTED THEREIN

(71) Applicant: Panasonic Intellectual Property Management Co., Ltd., Osaka (JP)

(72) Inventors: Yu Hasegawa, Kanagawa (JP); Chikao Kume, Fukuoka (JP); Shigefumi Akagi, Oita (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 235 days.

(21) Appl. No.: 14/889,435

(22) PCT Filed: Aug. 22, 2014

(86) PCT No.: PCT/JP2014/004327
§ 371 (c)(1),
(2) Date: Nov. 5, 2015

(87) PCT Pub. No.: WO2015/045269
PCT Pub. Date: Apr. 2, 2015

(65) Prior Publication Data
US 2016/0111198 A1 Apr. 21, 2016

(30) Foreign Application Priority Data
Sep. 27, 2013 (JP) ................... 2013-201519

(51) Int. Cl.
*H01F 27/28* (2006.01)
*H01F 38/14* (2006.01)
(Continued)

(52) U.S. Cl.
CPC ......... *H01F 27/2804* (2013.01); *H01F 38/14* (2013.01); *H01Q 1/3291* (2013.01);
(Continued)

(58) Field of Classification Search
CPC ................. H01F 5/00; H01F 27/00–27/36
(Continued)

(56) References Cited

U.S. PATENT DOCUMENTS 9,391,369 B2 * 7/2016 Miura ................ G06K 7/10316
2007/0247387 A1 * 10/2007 Kubo ...................... H01Q 7/08
343/787

(Continued)

FOREIGN PATENT DOCUMENTS

JP  2005-341144     12/2005
JP  3121577 U       5/2006
(Continued)

OTHER PUBLICATIONS

International Search Report of PCT application No. PCT/JP2014/004327 dated Oct. 21, 2014, Non-English.

*Primary Examiner* — Tuyen Nguyen
(74) *Attorney, Agent, or Firm* — Wenderoth, Lind & Ponack, L.L.P.

(57) ABSTRACT

Near field communication device has a configuration in which at least a part of coil of coil element is covered with cover at a portion opposite to substrate and a part of cover is fixed to substrate directly or indirectly. Therefore, even when near field communication device is mounted to one of various electronic apparatuses in a vicinity of display unit outer peripheral frame made of metal, a large change in impedance or a large reduction in magnetic field strength can be prevented. As a result, a reduction in receiving sensitivity can be suppressed.

11 Claims, 8 Drawing Sheets

(51) Int. Cl.
   *H01Q 1/32*      (2006.01)
   *H01Q 1/52*      (2006.01)
   *H01Q 7/06*      (2006.01)
   *H01Q 19/10*     (2006.01)
   *H04B 5/00*      (2006.01)
   *H04W 4/00*      (2018.01)

(52) U.S. Cl.
   CPC .............. *H01Q 1/526* (2013.01); *H01Q 7/06* (2013.01); *H01Q 19/10* (2013.01); *H04B 5/0081* (2013.01); *H04W 4/008* (2013.01)

(58) Field of Classification Search
   USPC ..................................... 336/65, 90, 200, 232
   See application file for complete search history.

(56) References Cited

U.S. PATENT DOCUMENTS

| | | | |
|---|---|---|---|
| 2009/0066466 A1 | 3/2009 | Arimura | |
| 2012/0025939 A1* | 2/2012 | Yamaguchi | H01Q 1/2216 336/105 |
| 2013/0063236 A1 | 3/2013 | Shin et al. | |
| 2014/0152521 A1 | 6/2014 | Yamaguchi et al. | |

FOREIGN PATENT DOCUMENTS

| | | | |
|---|---|---|---|
| JP | 2006-180436 | 7/2006 | |
| JP | 2011119819 A * | 6/2011 | |
| JP | 2013-062796 | 4/2013 | |
| JP | 2013-115684 | 6/2013 | |
| WO | WO 2012020581 A1 * | 2/2012 | ....... G06K 19/07779 |

* cited by examiner

NEAR-FIELD COMMUNICATIONS ELEMENT AND ELECTRONIC DEVICE HAVING SAME MOUNTED THEREIN

CROSS-REFERENCE TO RELATED APPLICATIONS

This application is a U.S. national stage application of the PCT International Application No. PCT/JP2014/004327 filed on Aug. 22, 2014, which claims the benefit of foreign priority of Japanese patent application 2013-201519 filed on Sep. 27, 2013, the contents all of which are incorporated herein by reference.

TECHNICAL FIELD

The present invention relates to a near field communication device used in, for example, near field wireless communication (Near Field Communication) and an electronic apparatus equipped with the near field communication device.

BACKGROUND ART

Recently, many electronic apparatuses each incorporating a near field communication device have been on the market.

That is to say, when high-volume data are transmitted/received between electronic apparatuses, only pairing is carried out by near field communication (NFC), and actual communication is carried out by more advanced Bluetooth (registered trademark) and Wi-Fi (registered trademark).

Such a near field communication device has a configuration including a substrate, and a coil element mounted on a surface of the substrate. The near field communication device is incorporated in a main body case of each of various electronic apparatuses (for example, the following PTL 1).

CITATION LIST

Patent Literature

PTL 1: Japanese Patent Application Unexamined Publication No. 2013-115684

SUMMARY OF THE INVENTION

Technical Problem

In the above-mentioned conventional example, it is convenient that pairing between electronic apparatuses can be carried out only by bringing near field communication device portions of the both apparatuses close to each other.

Actually, however, when the near field communication device is mounted to the inside of a main body case of each of various electronic apparatuses, for example, a display unit outer peripheral frame and a main body case outer peripheral frame, which are made of metal and disposed to a front surface side of the main body case, have caused a large change in impedance or a large reduction in magnetic field strength. As a result, receiving sensitivity has been often reduced largely.

Thus, an object of the present invention is to suppress reduction of receiving sensitivity.

Solution to Problem

In order to achieve the object, a near field communication device in accordance with the present invention includes a substrate, and a coil element mounted on a surface of the substrate. The coil element includes a core and a coil wound around an outer periphery of the core. At least a part of the coil is covered with a cover at a portion opposite to the substrate. A part of the cover is fixed to the substrate directly or indirectly. With this configuration, a desired object is achieved.

Advantageous Effect of Invention

As mentioned above, a near field communication device in accordance with the present invention includes a substrate, and a coil element mounted on a surface of the substrate. The coil element includes a core and a coil wound around an outer periphery of the core. At least a part of the coil is covered with a cover at a portion opposite to the substrate. A part of the cover is fixed to the substrate directly or indirectly. Therefore, this configuration makes it possible to suppress a reduction in receiving sensitivity.

That is to say, the present invention has a configuration in which at least a part of the coil is covered with a cover at a portion opposite to the substrate, and a part of the cover is fixed to the substrate directly or indirectly.

Therefore, even when the near field communication device is mounted to one of various electronic apparatuses in a vicinity of a metal structure, a large change in impedance or a large reduction in magnetic field strength can be prevented. As a result, a reduction in receiving sensitivity can be suppressed.

DETAILED DESCRIPTION OF THE PREFERRED EMBODIMENT

Hereinafter, one exemplary embodiment of the present invention is described with reference to the attached drawings.

First Exemplary Embodiment

Figure 1:
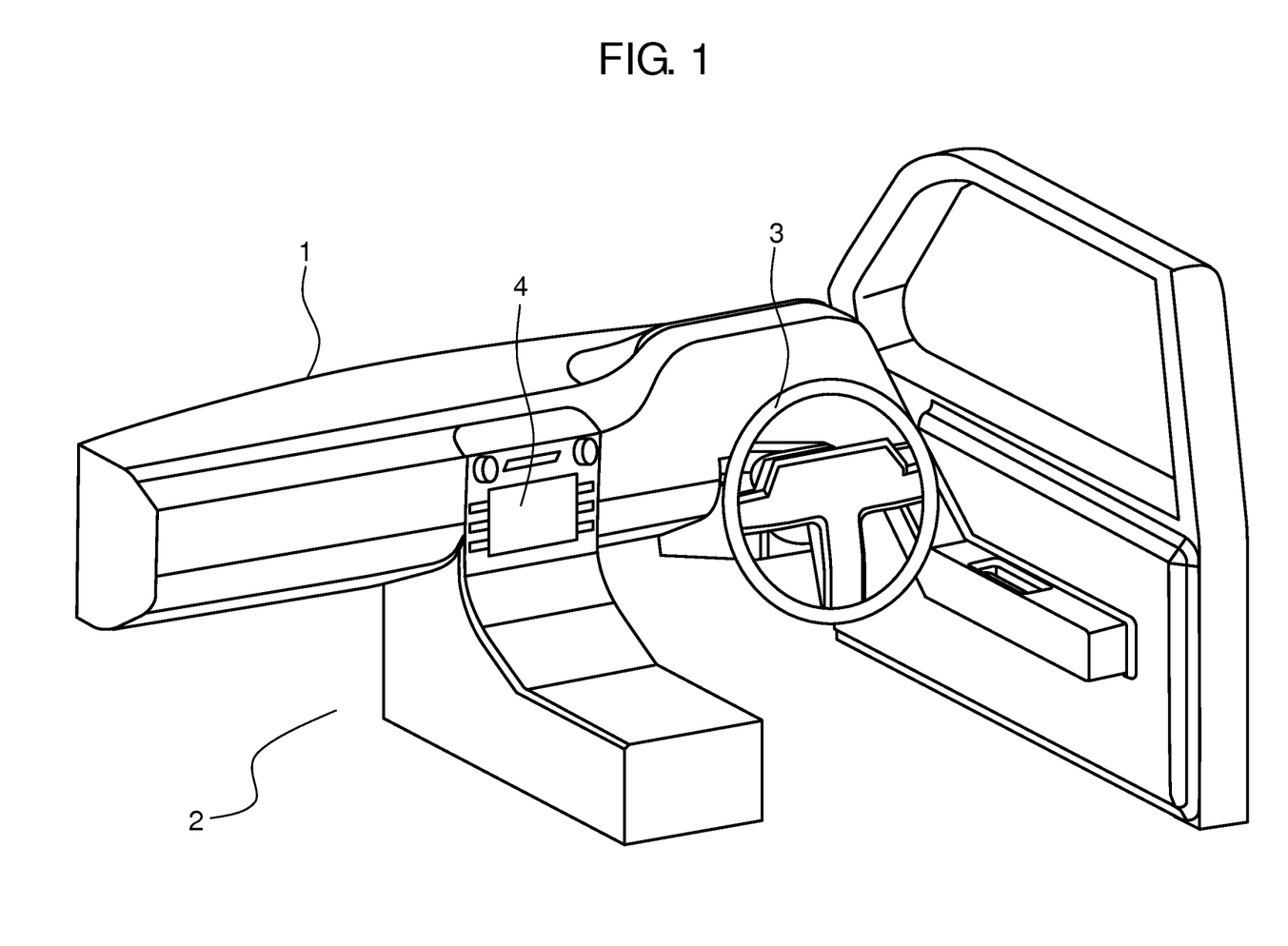
FIG. 1 is a perspective view showing a state in which an electronic apparatus is placed in an inside of an automobile in accordance with a first exemplary embodiment of the present invention.

In FIG. 1, steering wheel 3 is placed in front of a front seat (not shown) in inside 2 of automobile 1.

Figure 2:
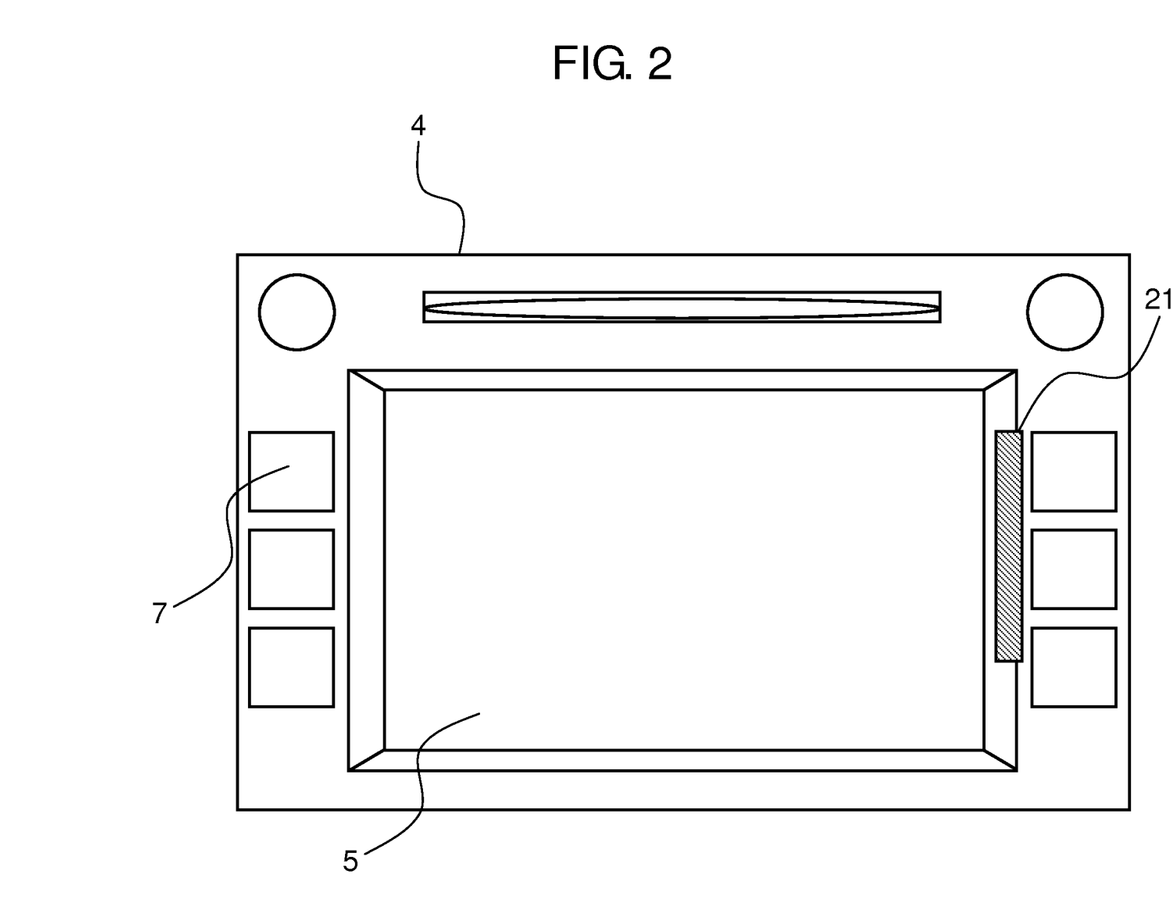
FIG. 2 is a front view of the electronic apparatus.

Furthermore, electronic apparatus 4 shown in FIG. 2 is disposed beside steering wheel 3.

Electronic apparatus 4 is configured to reproduce, for example, video and audio, and includes main body case 20 and display unit 5 provided to the front surface side of main body case 20.

Figure 3:
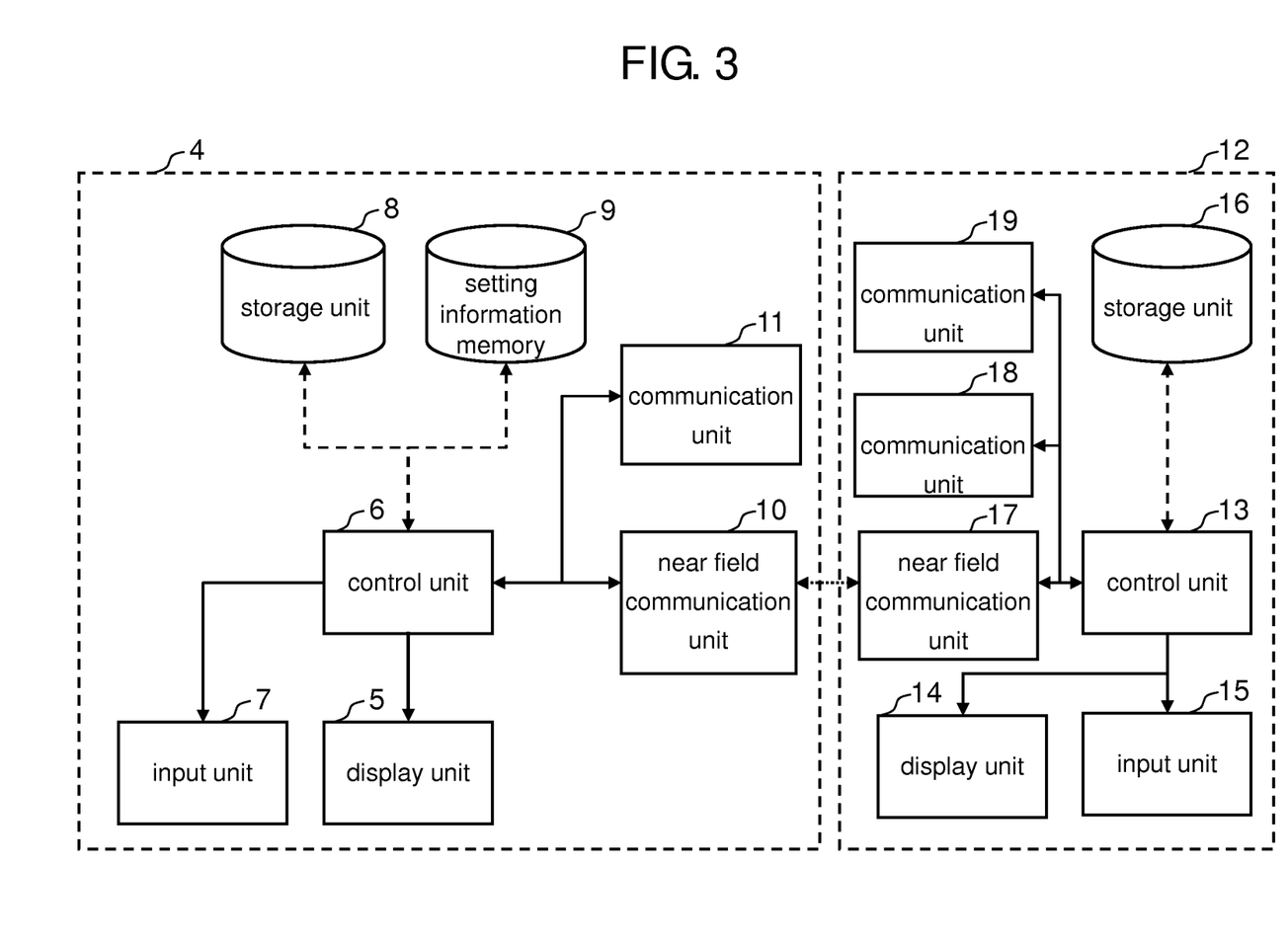
FIG. 3 is a control block diagram of the electronic apparatus.

Furthermore, as shown in FIG. 3, display unit 5 is connected to control unit 6. Input unit 7, storage unit 8, setting information memory 9, near field communication unit 10, and communication unit 11 are connected to control unit 6.

Input unit 7 is configured to carry out an operation for reproducing music or video. Storage unit 8 stores an operation program, and video and audio information.

Furthermore, setting information memory 9 stores, for example, information for carrying out pairing with other electronic apparatus 12 (for example, a portable telephone).

Furthermore, communication unit 11 is configured to perform communication with electronic apparatus 12 (for example, a portable telephone) by more advanced Bluetooth (registered trademark) or Wi-Fi (registered trademark) after pairing with electronic apparatus 12 (for example, a portable telephone) is carried out.

Electronic apparatus 12 (for example, a portable telephone) is one of common apparatuses. Display unit 14, input unit 15, storage unit 16, near field communication unit 17, and communication units 18 and 19 are connected to control unit 13.

Among them, near field communication unit 17 is configured to perform near field communication with near field communication unit 10 of electronic apparatus 4. Furthermore, communication unit 18 is configured to perform communication with communication unit 11 of electronic apparatus 4 by more advanced Bluetooth (registered trademark) or Wi-Fi (registered trademark).

In addition, communication unit 19 is configured to perform telephone and Internet communication.

Note here that in FIG. 3, in order to avoid complexity of the drawing, a loudspeaker connected to control unit 6 of electronic apparatus 4, a microphone for talking of electronic apparatus 12, and the like, are not shown.

Figure 4:
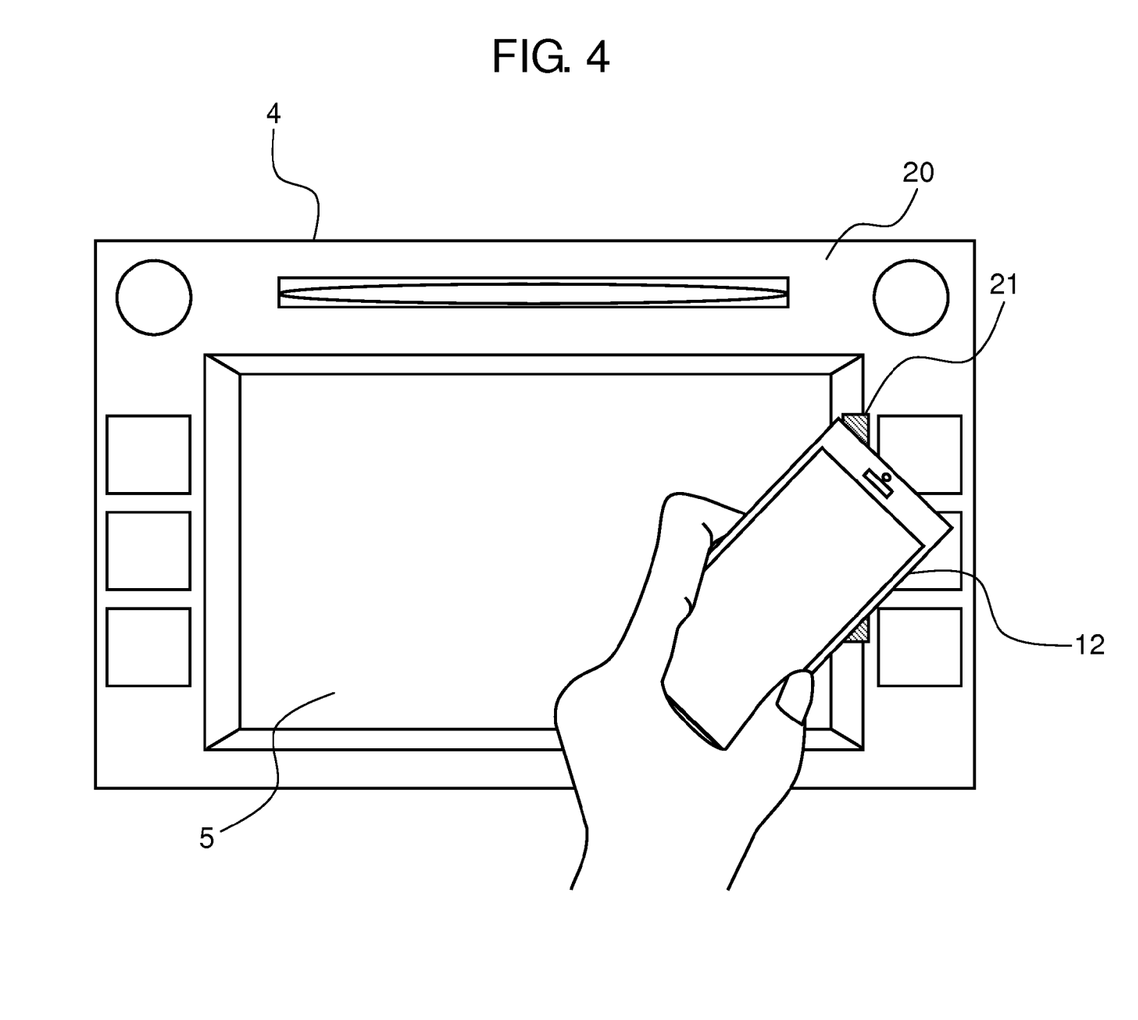
FIG. 4 is a front view of the electronic apparatus.

This exemplary embodiment is characterized in that, as shown in FIG. 4, near field communication between electronic apparatuses 4 and 12 is enabled by bringing electronic apparatus 12 closer to near field communication unit 21 provided at a front surface side of main body case 20 constituting electronic apparatus 4 and at a lateral part of display unit 5.

Specifically, by bringing electronic apparatus 12 closer to near field communication unit 21 of electronic apparatus 4, pairing between electronic apparatuses 4 and 12 is carried out, and then communication by more advanced Bluetooth (registered trademark) or Wi-Fi (registered trademark) is performed between electronic apparatuses 4 and 12.

Figure 5:
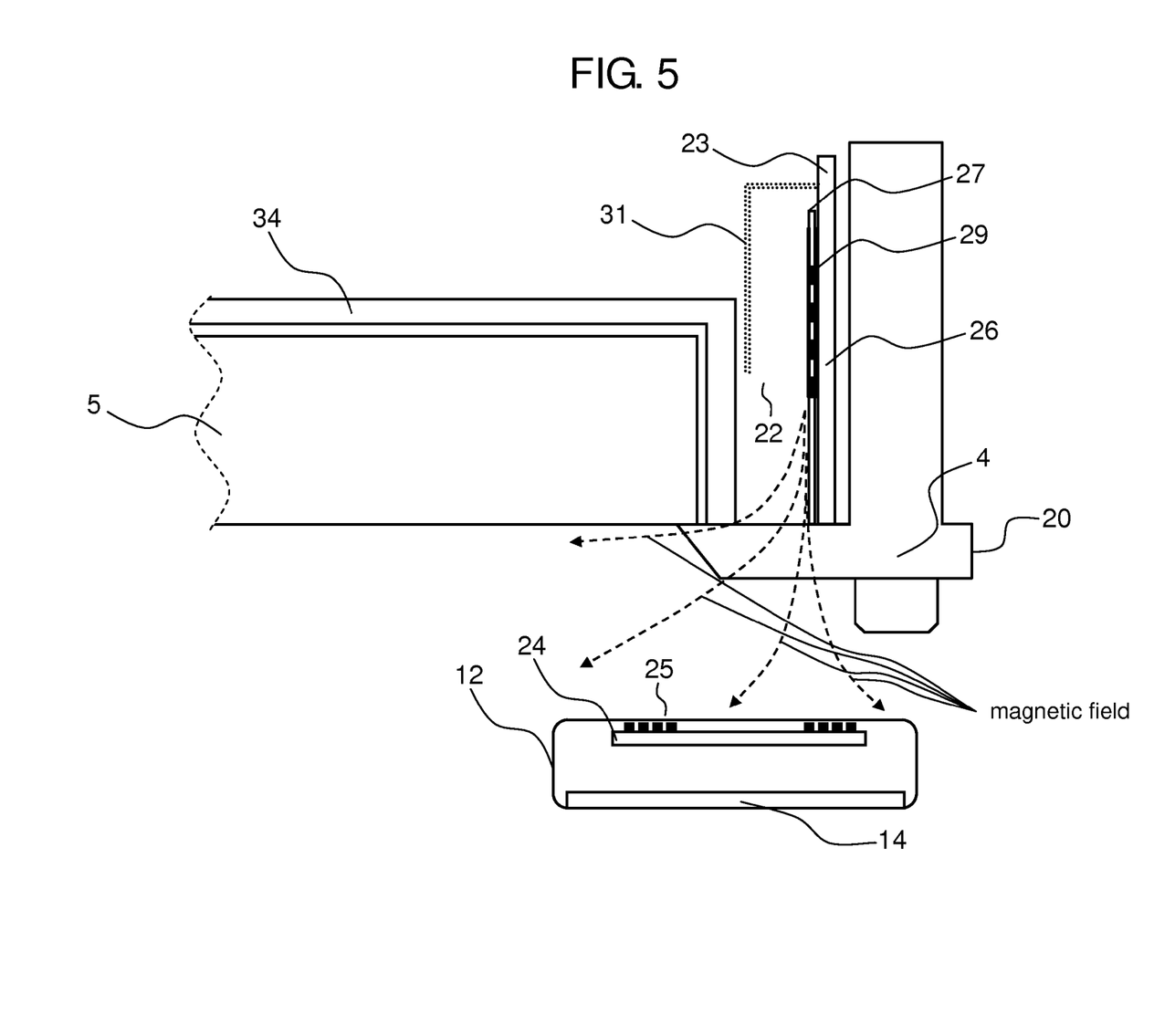
FIG. 5 is a plan sectional view of the electronic apparatus.

Therefore, in this exemplary embodiment, as shown in FIG. 5, near field communication device mounting section 22 is provided at a rear face side of near field communication unit 21 of electronic apparatus 4, and near field communication device 23 is mounted to this part.

Figure 9:
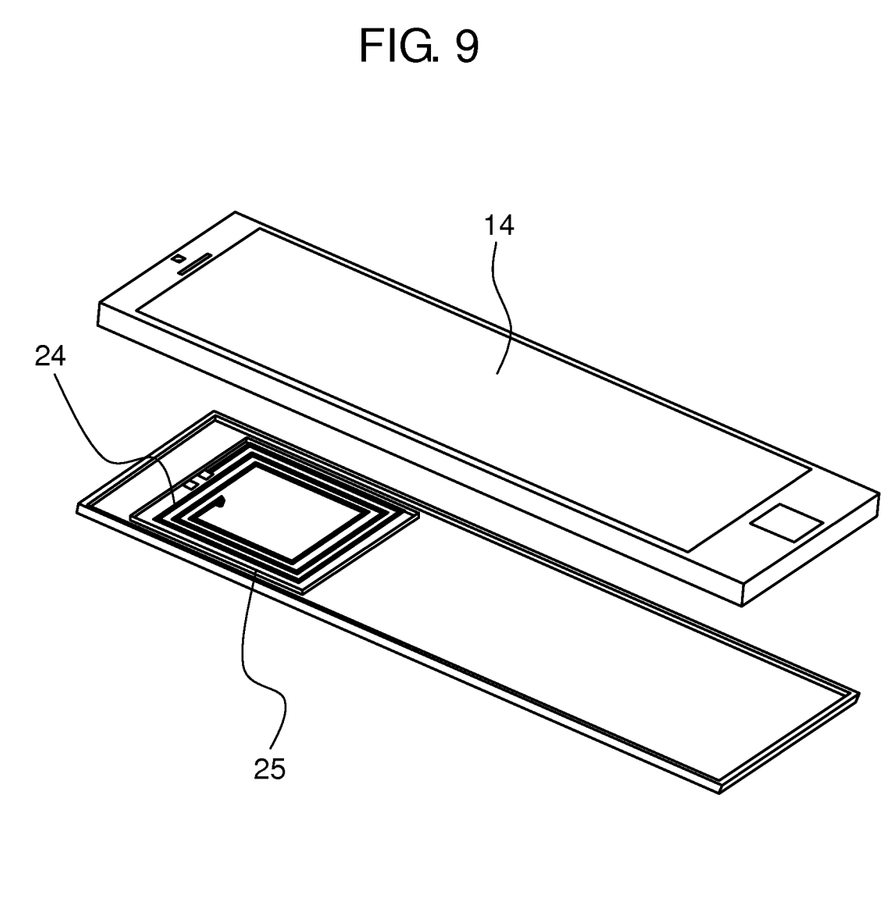
FIG. 9 is an exploded perspective view showing a near field communication device of another electronic apparatus.

Furthermore, near field communication device 24 is mounted to electronic apparatus 12 as shown in FIG. 9. Near field communication device 24 is a common device configured by winding coil 25 in a planar shape.

Figure 6:
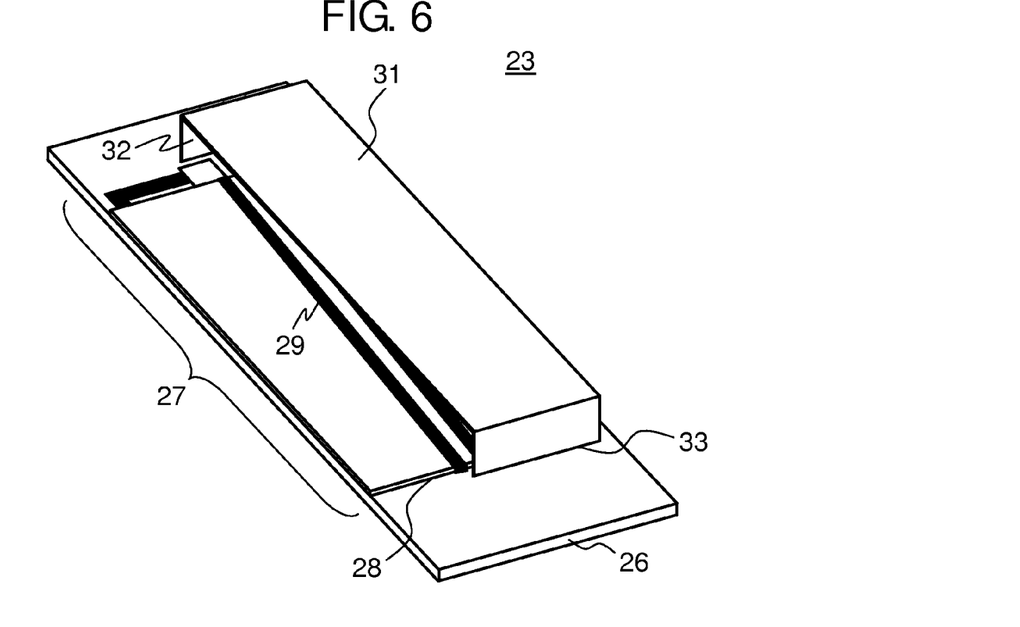
FIG. 6 is a perspective view showing a near field communication device of the electronic apparatus.
Figure 7:
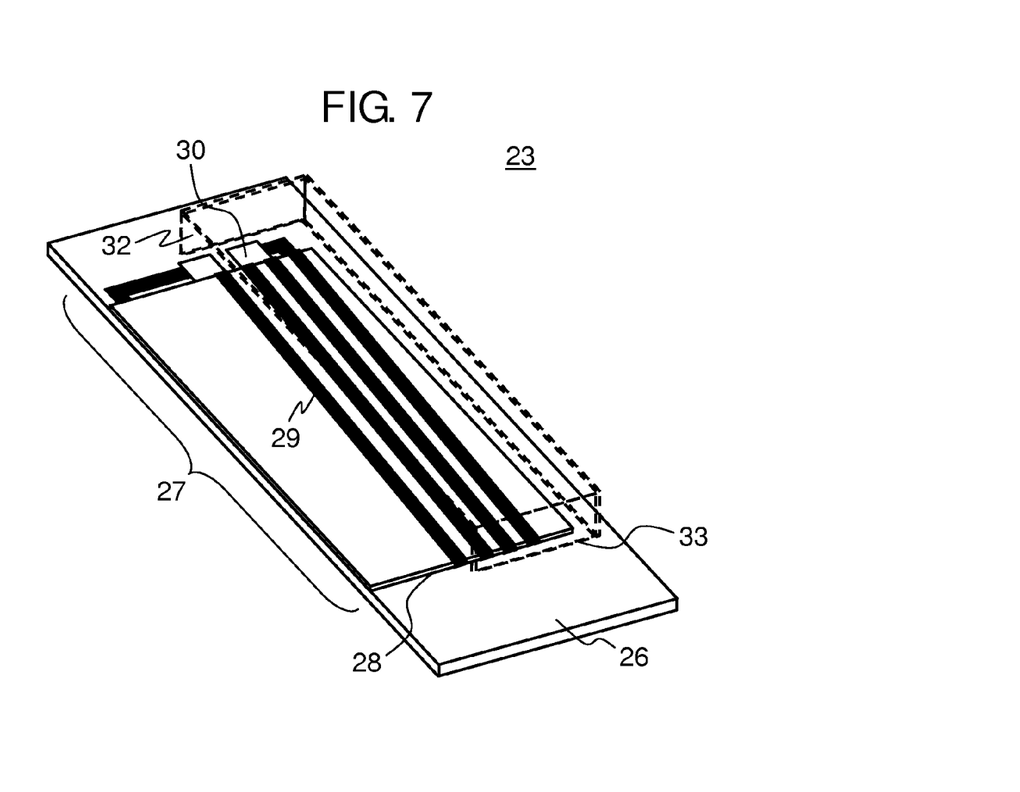
FIG. 7 is a partial see-through perspective view showing the near field communication device of the electronic apparatus.
Figure 8:
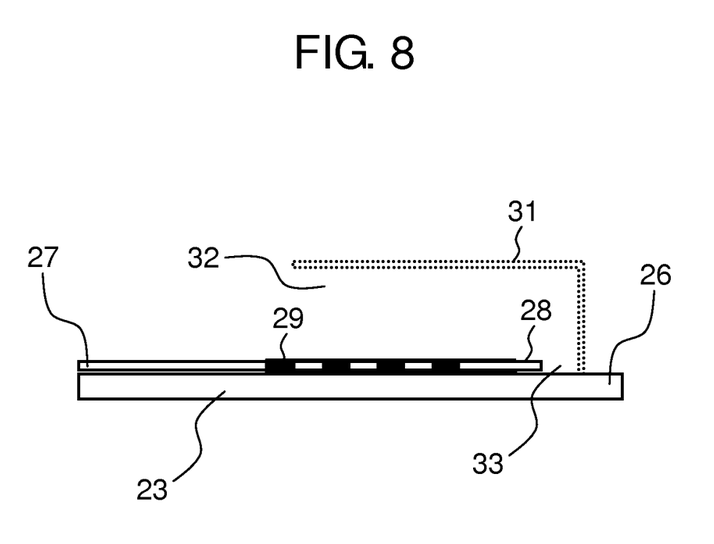
FIG. 8 is a partial see-through side view showing the near field communication device of the electronic apparatus.

On the other hand, near field communication device 23 of electronic apparatus 4 includes substrate 26 and coil element 27 mounted on a surface of substrate 26 as shown in FIGS. 6 to 8.

Coil element 27 has a configuration in which coil 29 is wound around outer periphery including front and rear surfaces of ferrite plate core 28. Furthermore, both ends of coil 29 are coupled to near field communication unit 10 via input/output terminal 30.

Note here that, as can be understood from FIGS. 6 to 8, coil 29 constituting coil element 27 is wound around a portion opposite to one side of plate core 28 (the left side in FIGS. 6 to 8, that is, the front surface side of main body case 20 constituting electronic apparatus 4).

Then, as can be understood from FIGS. 6 to 8, coil element 27 is mounted on the surface of substrate 26 in a state in which one side of plate core 28 constituting coil element 27 is brought close to one side of substrate 26 (at the left side in FIGS. 6 to 8, that is, the front surface side of main body case 20 constituting electronic apparatus 4).

Furthermore, in this state, at least a part of coil 29 is covered with cover 31 at a portion opposite to substrate 26. A part of cover 31 is directly fixed to substrate 26 by soldering.

Cover 31 is made of metal such as iron (magnetic substance) and copper (non-magnetic substance), and processed as shown in FIGS. 6 to 8.

Specifically, cover 31 has a case shape including one lateral face side opening 32 and substrate side opening 33. Cover 31 is mounted on the surface of substrate 26 and fixed thereto by soldering in a state in which one lateral face side opening 32 of cover 31 faces one side of substrate 26 and substrate side opening 33 of cover 31 faces substrate 26, respectively.

Near field communication device 23 having such a configuration is mounted to near field communication device mounting section 22 provided at the rear face side of near field communication unit 21 of electronic apparatus 4 as shown in FIG. 5.

Specifically, display unit outer peripheral frame 34 that is the outer periphery of display unit 5 is provided at a front surface side of main body case 20. Between display unit outer peripheral frame 34 and its outer main body case 20, slot-shaped near field communication device mounting section 22 is provided. Near field communication device 23 is mounted to section 22 such that cover 31 faces display unit outer peripheral frame 34 and one lateral face side opening 32 of cover 31 faces the front surface side of main body case 20.

Then, as shown in FIG. 5, when pairing between electronic apparatuses 4 and 12 is carried out by bringing electronic apparatus 12 closer to near field communication unit 21 of electronic apparatus 4, a high frequency signal is supplied to coil 29 of near field communication device 23 of electronic apparatus 4. As a result, magnetic fluxes reach coil 25 of electronic apparatus 12 as shown in arrows, and thus the pairing can be carried out.

At this time, near field communication device 23 of electronic apparatus 4 is in the vicinity of metallic display unit outer peripheral frame 34. However, since at least a part of coil 29 is covered with metallic cover 31 at a portion opposite to substrate 26, a large change in impedance or a large reduction in magnetic field strength due to presence of frame 34 in the vicinity can be prevented. As a result, a reduction in receiving sensitivity can be suppressed.

That is to say, when cover 31 is made of a magnetic metal (for example, iron), magnetic fluxes at the outer periphery among the magnetic fluxes generated from coil 29 proceed inside cover 31, and therefore they do not reach display unit outer peripheral frame 34 provided in the vicinity. This prevents the impedance from being largely changed or the magnetic field strength from being largely reduced.

Furthermore, when cover 31 is made of a non-magnetic metal (for example, copper), magnetic fluxes at the outer periphery among the magnetic fluxes generated from coil 29 assumed to pass through cover 31. Actually, however, magnetic fluxes are in a high-frequency state, resulting in proceeding on a surface of cover 31 made of the non-magnetic substance (skin effect). As a result, the magnetic fluxes do not reach display unit outer peripheral frame 34 provided in the vicinity. This prevents the impedance from being largely changed or the magnetic field strength from being largely reduced.

Furthermore, as shown in FIG. 5, when the substantially entire part of coil 29 is covered with cover 31, outside of cover 31, a magnetic flux spreads also in the direction of display unit outer peripheral frame 34 made of a magnetic substance. As a result, a communication area in the front of near field communication unit 21 of electronic apparatus 4 is broadened, thus making the communication to electronic apparatus 12 smooth.

Furthermore, near field communication device 23 in accordance with this exemplary embodiment includes substrate 26, and coil element 27 mounted on the surface of substrate 26. Moreover, coil element 27 has a configuration in which coil 29 is wound around outer periphery including front and rear surfaces of plate core 28 made of ferrite. In addition, coil 29 is covered with cover 31.

Consequently, near field communication device 23 can be thinned, and therefore be mounted to the above-mentioned slot-shaped near field communication device mounting section 22.

On the contrary, since a size of main body case 20 can be reduced and a size of display unit 5 can be increased, a mounting effect can be enhanced.

Note here that FIG. 5 shows communication from electronic apparatus 4 to electronic apparatus 12. At the time of communication from electronic apparatus 12 to electronic apparatus 4, the direction of the magnetic flux is reversed.

Furthermore, FIG. 5 shows an example in which metallic display unit outer peripheral frame 34 is brought closer to near field communication device 23. However, also when a main body case outer peripheral frame (although not shown, a portion confronting display unit outer peripheral frame 34 and positioned on the right of substrate 26 of near field communication device 23 in FIG. 5) disposed in front of main body case 20 is brought close to near field communication device 23, the same effect can be exhibited.

Furthermore, cover 31 of the above-mentioned exemplary embodiment has a case shape having one lateral face side opening 32 and substrate side opening 33, but a cover may have a configuration in which a plate-shaped cover (not shown) adhesively bonded to a surface of coil element 27 at an opposite side to substrate 26 (the upper part in FIGS. 6 to 8) via an adhesive layer (not shown) (the cover is indirectly fixed to substrate 26 of coil element 27).

INDUSTRIAL APPLICABILITY

As mentioned above, a near field communication device of the present invention has a configuration in which at least a part of the coil is covered with a cover at a portion opposite to the substrate, and a part of the cover is fixed to the substrate directly or indirectly.

Therefore, even when the near field communication device is mounted to one of various electronic apparatuses in a vicinity of a metal structure, a large change in impedance or a large reduction in magnetic field strength can be prevented. As a result, a reduction in receiving sensitivity can be suppressed.

Therefore, a near field communication device of the present invention is expected to be used in various electronic apparatuses.

REFERENCE MARKS IN THE DRAWINGS 8 storage unit
9 setting information memory
10 near field communication unit
11 communication unit
12 electronic apparatus
13 control unit
14 display unit
15 input unit
16 storage unit
17 near field communication unit
18 communication unit
19 communication unit
20 main body case
21 near field communication unit
22 near field communication device mounting section
23 near field communication device
24 near field communication device
25 coil
26 substrate
27 coil element
28 plate core
29 coil
30 input/output terminal
31 cover
32 one lateral face side opening
33 substrate side opening
34 display unit outer peripheral frame

The invention claimed is:

1. A near field communication device comprising:
   a substrate; and
   a coil element mounted on a first surface of the substrate, and including a core and a coil wound around an outer periphery of the core,
   wherein at least a part of the coil is covered with a cover on a second surface opposite to the first surface of the substrate, and a part of the cover is fixed to the substrate directly or indirectly, and
   wherein the cover has a case shape including a one lateral face side opening and a substrate side opening, and the cover is mounted on the first surface of the substrate in a state in which the one lateral face side opening confronts the one side at which a near field communication unit where near field communication is executed to an electronic apparatus is positioned of the substrate and the substrate side opening confronts the first surface of the substrate.

2. The near field communication device of claim 1, wherein the coil element is configured by winding the coil around an outer periphery including front and rear surfaces of the plate-like core.

3. The near field communication device of claim 1, wherein the coil element is mounted on the first surface of the substrate in a state in which one side of the plate-like core constituting the coil element is brought close to one side at which a near field communication unit where near field communication is executed to an electronic apparatus is positioned of the substrate.

4. The near field communication device of claim 1, wherein the coil element is configured by winding the coil around the plate-like core at a portion opposite side to the one side at which a near field communication unit where near field communication is executed to an electronic apparatus is positioned of the plate-like core.

5. The near field communication device of claim 1, wherein the cover is made of metal.

6. The near field communication device of claim 1, wherein the cover is plate-shaped, and the plate-shaped cover is adhesively bonded via an adhesive layer on the second surface of the substrate.

7. An electronic apparatus comprising the near field communication device as defined in claim 1, wherein the near field communication device is mounted on a rear face of a near field communication unit communicating with an electronic device such that one side of the substrate of the near field communication device faces the near field communication unit.

8. The electronic apparatus of claim 7, wherein the near field communication unit includes, at a rear face side, a near field communication device mounting section, and in the near field communication device mounting section, a metal structure is disposed to at least one of both faces at the one side of the substrate of the near field communication device.

9. The electronic apparatus of claim 8, wherein the metal structure is a display unit outer peripheral frame disposed in a front surface side of a main body case.

10. The electronic apparatus of claim 7, wherein the metal structure is a main body case outer peripheral frame disposed in the front surface side of the main body case.

11. An electronic apparatus comprising the near field communication device as defined in claim 1, wherein the near field communication device is mounted to a near field communication unit of a main body case such that one side of the substrate of the near field communication device faces the near field communication unit of the main body case.

* * * * *